United States Patent [19]

Yahagi et al.

[11] Patent Number: 5,065,327

[45] Date of Patent: Nov. 12, 1991

[54] METHOD FOR PREDICTING A SPEED OF A VEHICLE WHICH IS EQUIPPED WITH AN ANTILOCK BRAKE DEVICE

[75] Inventors: Toshio Yahagi; Yoshihiro Iwagawa; Yoichi Sugimoto; Tsuyoshi Satoh, all of Wako, Japan

[73] Assignee: Honda Giken Kogyo Kabushiki Kaisha, Tokyo, Japan

[21] Appl. No.: 383,490

[22] Filed: Jul. 24, 1989

[30] Foreign Application Priority Data

May 22, 1989 [JP] Japan .................. 1-128281

[51] Int. Cl.⁵ .................. G06F 7/70; G06F 15/48; B60T 8/86; B60T 8/82
[52] U.S. Cl. .................. 364/426.02; 364/424.01; 303/93; 303/96; 303/106
[58] Field of Search .................. 364/426.01, 426.02, 364/426.03, 424.01, 434, 426.04; 280/91; 324/161, 162, 163, 166; 303/92, 95, 96, 102, 103, 106, 93

[56] References Cited

U.S. PATENT DOCUMENTS

| | | |
|---|---|---|
| 3,950,036 | 4/1976 | Fink et al. |
| 4,435,768 | 3/1984 | Arikawa .................. 364/426.02 |
| 4,439,832 | 3/1984 | Sato et al. .................. 364/426.02 |
| 4,497,026 | 1/1985 | Braschel .................. 364/426.02 |
| 4,679,808 | 7/1987 | Ito et al. .................. 280/91 |
| 4,787,682 | 11/1988 | Muto .................. 364/426.01 X |
| 4,809,183 | 2/1989 | Eckert .................. 364/426.04 |
| 4,844,557 | 7/1989 | Giers .................. 303/106 X |
| 4,877,295 | 10/1989 | Yoshino .................. 364/426.01 X |
| 4,902,076 | 2/1990 | Ushijima et al. .......... 364/426.02 X |
| 4,933,854 | 6/1990 | Miyake .................. 364/426.02 |

FOREIGN PATENT DOCUMENTS

3610585A1 10/1986 Fed. Rep. of Germany .
3923782A1 1/1990 Fed. Rep. of Germany .

Primary Examiner—Parshotam S. Lall
Assistant Examiner—E. J. Pipala
Attorney, Agent, or Firm—Armstrong, Nikaido, Marmelstein, Kubovcik & Murray

[57] ABSTRACT

The present invention is a method for estimating the speed of a vehicle with antilock brake devices by obtaining a vehicle speed as a reference value for determining a slip ratio of a wheel based upon a wheel speed, an acceleration and a deceleration. At least the deceleration is based upon a differentiated value of a highest wheel speed from all wheels. In a vehicle in which the drive wheels are rigidly coupled, at least the deceleration is based upon a differentiated value of a highest value of the lowest wheel speed of the drive wheels and the wheel speeds of the driven wheels.

19 Claims, 3 Drawing Sheets

METHOD FOR PREDICTING A SPEED OF A VEHICLE WHICH IS EQUIPPED WITH AN ANTILOCK BRAKE DEVICE

FIELD OF THE INVENTION

The present invention relates to a method for predicting a speed of a vehicle, which is equipped with an antilock brake device, in order to obtain a vehicle speed. The vehicle speed is to be a reference value which is used for determining a slip ratio of a wheel. The slip ratio is based upon a wheel speed, an acceleration, and a deceleration in the vehicle which has an antilock brake device.

BACKGROUND OF THE INVENTION

A conventionally known method for estimating a vehicle speed is disclosed, for example, in Japanese Patent Publication No. 6902/1981. With this method, the vehicle speed is approximated according to the maximum deceleration intrinsic for the vehicle when the vehicle is decelerating. According to this method, a presumed vehicle speed, which is close to the actual vehicle speed, can be obtained while the vehicle is traveling on a road surface which exhibits a maximum deceleration. However, as shown in FIG. 3, the accuracy of the presumed vehicle speed V, with respect to the actual vehicle speed V', deteriorates when the vehicle is on a road surface having a low vehicle deceleration, so that the start of an antilock brake control tends to be delayed due to the deterioration of the accuracy between the estimated speed and the actual speed.

SUMMARY OF THE INVENTION

During antilock brake control, the phases of the wheel speeds $V_{w1}$, $V_{w2}$, $V_{w3}$ and $V_{w4}$ of a four-wheel vehicle frequently deviate from each other due to the weight distribution and due to the difference in the frictional coefficients of the road surfaces as shown in FIG. 4. By selecting the highest wheel speed of the four wheels, a presumed vehicle speed can be obtained which is close to the actual vehicle speed V.

It is, therefore, an object of the present invention to provide a method for estimating a speed of a vehicle, with an antilock brake device, which can eliminate the difficulty of the conventional method and which can predict a vehicle speed based upon acceleration, deceleration and wheel speed which are close to actual values.

According to a first feature of the present invention, there is provided a method for estimating a speed of a vehicle with an antilock brake device by obtaining a vehicle speed as a reference value for determining a slip ratio of a wheel based upon a wheel speed, an acceleration, and a deceleration. At least the deceleration is obtained based upon a differentiated value of a highest value of wheel speeds from all wheels. The highest selected value of the wheel speeds of all the wheels is closest to the actual vehicle speed at the time of controlling the antilock brake. Therefore, an estimated vehicle speed, which is close to the actual vehicle speed, is obtained by determining at least the deceleration from the differentiated value of the highest wheel speed value.

According to a second feature of the present invention, a method is provided for estimating a speed of a vehicle with an antilock brake device for obtaining a vehicle speed as a reference value for determining a slip ratio of a wheel based upon a wheel speed, an acceleration, and a deceleration. The vehicle has an antilock brake device and right and left drive wheels coupled substantially rigidly. At least the deceleration is based upon a differentiated value of the highest value of the lowest wheel speeds of the drive wheels and of the driven wheels. When the right and left drive wheels are substantially rigidly coupled, the wheel speeds of the right and left drive wheels are substantially equal. Therefore, even if the vehicle speed is estimated based upon the differentiated value of the highest value of the lowest wheel speed of the drive wheels and the driven wheels, an estimated speed, which is close to the actual vehicle speed, can be obtained which is similar to the first feature described above.

According to a third feature of the present invention, a predetermined acceleration is used as the acceleration value during accelerating, and the differentiated value is used as the deceleration value during decelerating. The predetermined acceleration is used as the acceleration, but the estimated vehicle speed will rapidly approach the actual vehicle speed by setting the predetermined acceleration to a large value.

According to a fourth feature of the present invention, a predetermined acceleration is used as the acceleration value during accelerating. A first predetermined value is used as the deceleration value when the differentiated value becomes equal to or less than the first predetermined value. The differentiated value is used as the deceleration value when the differentiated value exceeds the first predetermined value during decelerating. The estimated value speed will rapidly approach the actual vehicle speed during accelerating, similar to the third feature. The maximum deceleration, when the phases of the wheel speeds coincide, can be restricted.

According to a fifth feature of the present invention, a predetermined acceleration is used as the acceleration value during accelerating. A second predetermined value is used as the deceleration value when the differentiated value exceeds the second predetermined value. The differentiated value is used as the deceleration value when the differentiated value is less than or equal to the second predetermined value during decelerating. The estimated value speed will rapidly approach the actual vehicle speed during accelerating, similar to the third feature, and the minimum deceleration can be restricted when the phases of the wheel speeds coincide.

According to a sixth feature of the present invention, a vehicle body speed is estimated based upon a low value of a wheel speed from a plurality of wheels including right and left wheels on at least one axis. A predetermined acceleration value is used as the acceleration value during accelerating. A value is used as the deceleration value during decelerating which is obtained by subtracting a deceleration difference of inner and outer wheels from the differentiated value. The deceleration difference is generated due to the difference of the speeds of the inner and outer wheels when the vehicle is shifted from traveling in a rectilinear direction to traveling in a turning direction. The estimation accuracy can be improved by considering the difference of the decelerations between the inner and outer wheels at the time the vehicle changes its direction of travel.

According to a seventh feature of the present invention, the predetermined acceleration is the maximum acceleration of the vehicle. Therefore, the estimated vehicle speed during accelerating will rapidly approach the actual vehicle speed.

According to an eighth feature of the present invention, the first predetermined value is the maximum acceleration of the vehicle. The maximum deceleration can, therefore, be restricted in accordance with the maximum deceleration of the vehicle.

According to a ninth feature of the present invention, the second predetermined value is the minimum deceleration on a slippery road surface. The minimum deceleration can, therefore, be restricted according to the minimum deceleration on the slippery road surface.

According to a tenth feature of the present invention, the deceleration difference is set in response to an index representing the traveling speed based on a minimum turning radius of the vehicle according to the traveling speed of the vehicle. The difference of the decelerations between the inner and outer wheels at the time of turning the vehicle can be set to a variable value.

According to an eleventh feature of the present invention, the deceleration difference is set in response to an index representing the lateral acceleration of the vehicle and the traveling speed of the vehicle. The difference of the decelerations between the inner and outer wheels at the time of turning the vehicle can be set to a variable value.

According to the twelfth feature of the present invention, the deceleration difference is set in a response to a steering angle. The difference of the decelerations between the inner and outer wheels at the time of turning the vehicle can be set to a variable value.

According to the thirteenth feature of the present invention, the deceleration difference is set as the difference of the decelerations between the inner and outer wheels during turning at a speed in which the difference of the speeds between the inner and outer wheels becomes a maximum. The difference of the decelerations between the inner and outer wheels during turning of the vehicle can be set as a stationary value.

DESCRIPTION OF THE PREFERRED EMBODIMENTS

Figure 1:
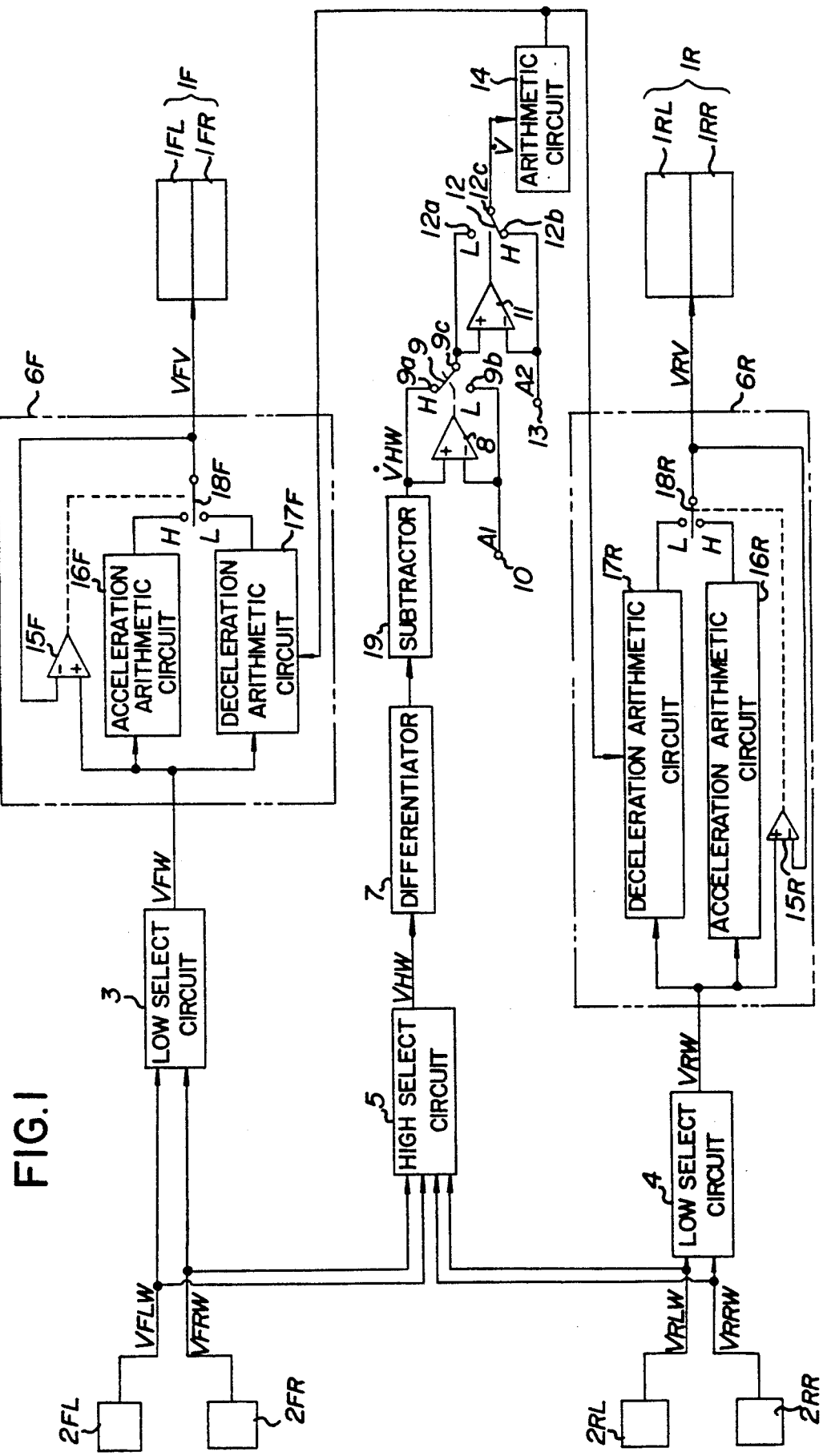
FIG. 1 is an overall block diagram showing an embodiment of the present invention.

The embodiments of the present invention will now be described with reference to the accompanying drawings. FIG. 1 shows a first embodiment of the present invention. Front wheel brakes are respectively mounted on both front wheels of a four-wheel vehicle with antilock braking devices. The front hydraulic braking pressures are controlled by an antilock brake control circuit $1_F$ when corresponding front wheels tend to be locked. Rear wheel brakes are respectively mounted on both rear wheels. Rear hydraulic braking pressures are controlled by an antilock brake control circuit $1_R$ when corresponding rear wheels tend to be locked. The antilock brake control circuits $1_F$ and $1_R$ respectively have control units $1_{FL}$ and $1_{FR}$; $1_{RL}$ and $1_{RR}$. The control units $1_{FL}$ and $1_{FR}$; $1_{RL}$ and $1_{RR}$, first determine that their slip ratios exceed an allowable value, when the corresponding wheel speed becomes equal to or less than a reference wheel speed, and second, start controlling the antilock braking of the corresponding wheel brake.

The reference wheel speed is obtained by multiplying a vehicle speed by a predetermined slip ratio. A vehicle speed $V_{FV}$, which is estimated based upon both front wheel speeds, is input to the antilock brake control circuit $1_F$. Similarly, a vehicle speed $V_{RF}$, which is based upon both rear wheel speeds, is input to the antilock brake control circuit $1_R$.

In order to approximate vehicle speeds $V_{FV}$ and $V_{RV}$, speed sensors $2_{FL}$ and $2_{FR}$ are respectively attached to both front wheels, and speed sensors $2_{RL}$ and $2_{RR}$ are respectively attached to both rear wheels. Front wheel speeds $V_{FLW}$ and $V_{FRW}$, obtained from the speed sensors $2_{FL}$ and $2_{FR}$, are input to a low select circuit 3. Rear wheel speeds $V_{RLW}$ and $V_{RRW}$, obtained from the speed sensors $2_{RL}$ and $2_{RR}$, are input to a low select circuit 4. Wheel speeds $V_{FLW}$, $V_{FRW}$, $V_{RLW}$ and $V_{RRW}$, obtained from the speed sensors $2_{FL}$, $2_{FR}$, $2_{RL}$ and $2_{RR}$, are input to a high select circuit 5.

The low select circuit 3 selects the lowest front wheel speed input from the front wheel speeds $V_{FLW}$ and $V_{FRW}$ as a front wheel speed $V_{FW}$. The low select circuit 4 selects the lowest rear wheel speed input from the rear wheel speeds $V_{RLW}$ and $V_{RRW}$ as a rear wheel speed $V_{RW}$. Front wheel estimated vehicle speed $V_{FV}$ and rear wheel estimated speed $V_{RV}$ are obtained by front wheel vehicle speed presuming means $6_F$ and rear wheel vehicle speed presuming means $6_R$ based upon a) the wheel speeds $V_{FW}$ and $V_{RW}$ selected by the low select circuits 3 and 4 and b) acceleration or deceleration. The estimated vehicle speeds $V_{FV}$ and $V_{RV}$ are respectively input to corresponding antilock brake control circuits $1_F$ and $1_R$.

The maximum wheel speed $V_{HW}$ obtained from the high select circuit 5 is input to a differentiator 7. The differentiated value of the maximum wheel speed $V_{HW}$ by the differentiator 7 is input to a subtractor 19 thereby to obtain the differentiated value $\dot{V}_{HW}$ of the maximum wheel speed $V_{HW}$. The subtractor 19 subtracts the deceleration difference between the inner and outer wheels from the differentiated value obtained from the differentiator 7. The deceleration difference between the inner and outer wheel is generated due to the difference of the speeds between the inner and outer wheels when the vehicle is shifted from traveling in a rectilinear direction to traveling in a turning direction. The deceleration difference is set as the difference of the decelerations between the inner and outer wheels at the time the vehicle turns such that the difference of the speeds between the inner and outer wheels becomes a maximum.

The output terminal of the subtractor 19 is connected to a non-inverted input terminal of a comparator 8, and is also connected to one individual contact $9a$ of a switch 9. A signal corresponding to a first predetermined value $A_1$ from a terminal 10 is input to an inverted input terminal of the comparator 8. The terminal 10 is also connected to the other individual contact $9b$ of the switch 9. The first predetermined value $A_1$ is defined as a maximum deceleration of the vehicle, such as, for example, in a range of $-1$ to $-1.4$ G.

The comparator 8 connects a common contact $9c$ of the switch 9 to the individual contact $9a$ when the comparator's output is a high level, and connects the common contact 9c to the other individual contact 9b when the comparator's output is a low level. Accordingly, when the output of the subtractor 19 exceeds the first predetermined value $A_1$, the output of the subtractor 19 is output from the common contact 9c of the switch 9, while when the output of the subtractor 19 is below the first predetermined value $A_1$, the first predetermined value $A_1$ is output from the common contact 9c of the subtractor 19, and the minimum value output from the common contact 9c of the switch 9 becomes the first predetermined value $A_1$.

The common contact 9c of the switch 9 is connected to a non-inverted input terminal of a comparator 11, and is also connected to an individual contact 12a of a switch 12. On the other hand, a terminal 13 is connected to an inverted input terminal of the comparator 11 The terminal 13 is also connected to the other individual contact 12b of the switch 12. A second predetermined value $A_2$ is input to the terminal 13. The second predetermined value $A_2$ is set to a minimum deceleration which corresponds to a presumed frictional coefficient on a road surface which is normally considered to be the most slippery, such as, for example, approximately $-0.3$ G.

The comparator 11 outputs a signal of a low level when the output of the common contact 9c of the switch 9 is equal to or less than the second predetermined value $A_2$ thereby to connect the common contact 12c of the switch 12 to the individual contact 12a. The comparator 11 outputs a signal of a high level when the output of the common contact 9c exceeds the second predetermined value $A_2$ thereby to connect the common contact 12c to the other individual contact 12b. Accordingly, the common contact 12c of the switch 12 outputs a differentiated value $\dot{V}$ exhibiting deceleration in a range of $-1 \sim -1.4$ G to $-0.3$ G.

The common contact 12c of the switch 12 is connected to an arithmetic circuit 14. The arithmetic circuit 14 calculates a speed difference $\Delta V$ by the following equation (1), and the speed difference $\Delta V$ has a negative symbol.

$$\Delta V = \dot{V} \times \Delta t \quad (1)$$

where $\Delta t$ is the time of one calculating cycle in the arithmetic circuit 14, such as, for example, several msec.

The front wheel speed presuming means $6_F$ has a comparator $15_F$, an acceleration arithmetic circuit $16_F$, a deceleration arithmetic circuit $17_F$ and a switch $18_F$. The wheel speed $V_{FW}$ output from the low select circuit 3 is input to a non-inverted input terminal of the comparator $15_F$, and is also input to the acceleration arithmetic circuit $16_F$ and the deceleration arithmetic circuit $17_F$. The output of the arithmetic circuit 14, i.e., a speed difference $\Delta V$ is input to the deceleration arithmetic circuit $17_F$. The acceleration arithmetic circuit $16_F$ calculates the vehicle speed according to the following equation (2), and the deceleration arithmetic circuit $17_F$ calculates the vehicle speed according to the following equation (3).

$$V_{FV} = V_{FW} + 1.4 \, G \times \Delta t \quad (2)$$

$$V_{FV} = V_{FW} + \Delta V \quad (3)$$

In equation (2), 1.4 G designates the maximum acceleration to occur in the vehicle, and the vehicle speed $V_{FV}$ is estimated based on the assumption that the maximum acceleration of 1.4 G is generated at the time of acceleration.

The switch $18_F$ is interposed between the acceleration arithmetic circuit $16_F$, the deceleration arithmetic circuit $17_F$ and the front wheel antilock brake control circuit $1_F$. The switch $18_F$ connects the acceleration arithmetic circuit $16_F$ to the front wheel antilock brake control circuit $1_F$ when the output of the comparator $15_F$ is a high level, and connects the deceleration arithmetic circuit $17_F$ to the front wheel antilock brake control circuit $1_F$ when the output of the comparator $15_F$ is a low level. The output signal of the switch $18_F$, i.e., the estimated vehicle speed $V_{FV}$ is input to an inverted input terminal of the comparator $15_F$. Accordingly, the comparator $15_F$ compares the estimated vehicle speed $V_{FV}$ with the wheel speed $V_{FW}$ to determine whether the vehicle is in an accelerating state or a decelerating state. Thus, the output of the acceleration arithmetic circuit $16_F$ is output in the accelerating state or the output of the deceleration arithmetic circuit $17_F$ is output in the decelerating state as the estimated vehicle speed $V_{FV}$.

The rear wheel vehicle speed presuming means $6_R$ has substantially the same arrangement as that of the front wheel vehicle speed presuming means $6_F$ to carry out a similar operation by having a comparator $15_R$, an acceleration arithmetic circuit $16_R$, a deceleration arithmetic circuit $17_R$, and a switch $18_R$.

The operation of this embodiment will be described. The phases of the wheel speeds of four wheels are frequently deviated at the time of controlling the antilock brake. In such a case, the estimated vehicle speed which is close to the actual vehicle speed can be approximated by obtaining the deceleration based upon the differentiated value $\dot{V}$ obtained by differentiating the maximum wheel speed $V_{HW}$ of the four wheels selected by the high select circuit 5.

Since the vehicle speed is presumed with the set acceleration 1.4 G at the time of accelerating, a vehicle speed which is close to the actual vehicle speed can be rapidly obtained when the vehicle is shifted from a decelerating state to an accelerating state.

When the phases of the wheel speeds of the four wheels coincide, the differentiated value $\dot{V}$ become a value which exceeds the maximum deceleration of the vehicle, and may be calculated as a smaller deceleration than the minimum deceleration. However, since the deceleration is restricted by the maximum deceleration of the vehicle, i.e., $-1$ to $-1.4$ G and the minimum deceleration on the slippery road surface, i.e., $-0.3$ G, the vehicle speed is not estimated based upon the acceleration or deceleration which is actually impossible. Rather, the vehicle speed can be rapidly estimated based upon a value which is close to the actual acceleration or deceleration.

The value obtained by differentiating the maximum wheel speed $V_{HW}$ of the four wheels by the differentiator 7 is further subtracted by the subtractor 19 to obtain the differentiated value $\dot{V}_{HW}$ by considering the difference of the decelerations between the inner and outer wheels due to the difference of the speeds between the inner and outer wheels when the vehicle is shifted from traveling in a rectilinear direction to traveling in a turning direction, thereby improving the estimation accuracy of the vehicle speed.

Figure 2:
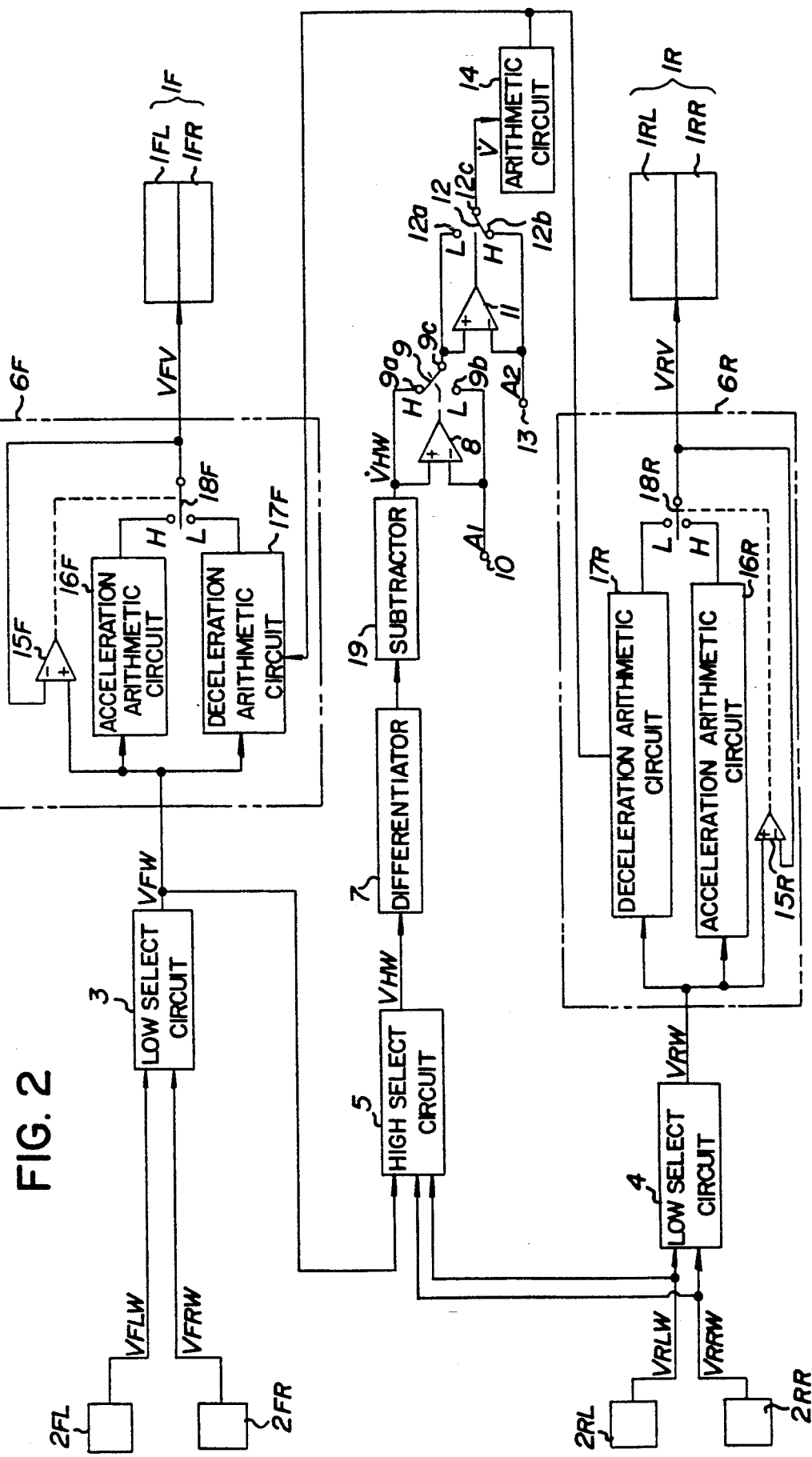
FIG. 2 is an overall block diagram showing another embodiment of the present invention.
Figure 3:
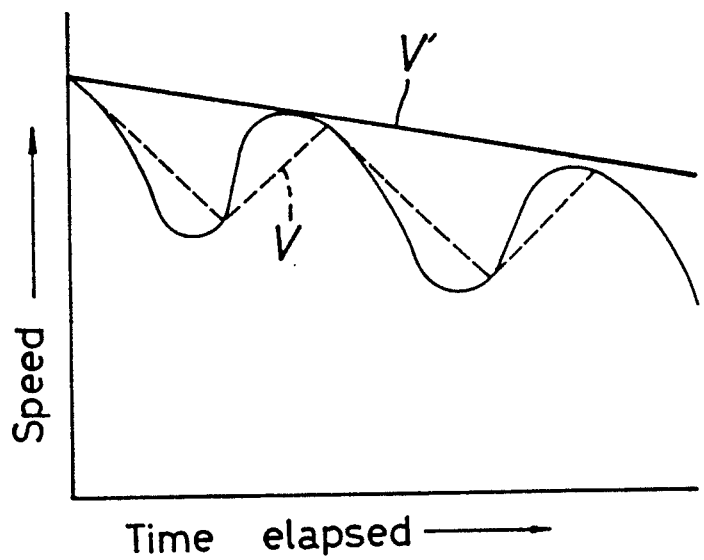
FIG. 3 is a graph showing the speed characteristic for explaining the displacement of the presumed vehicle speed with respect to the actual vehicle speed.
Figure 4:
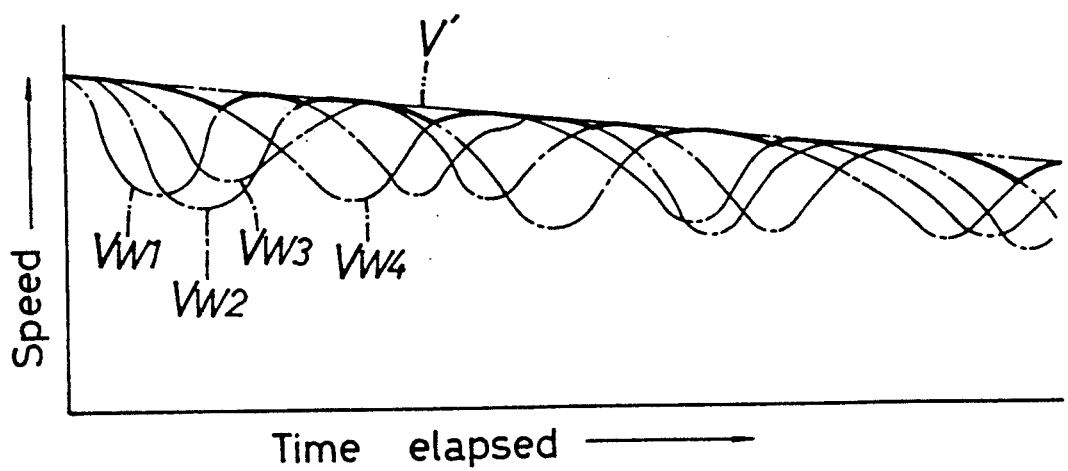
FIG. 4 is a graph showing the speed characteristic for showing the displacement of the phases of four wheels while controlling an antilock brake.

FIG. 2 shows another embodiment of the present invention, wherein the same components as those in the embodiment in FIG. 1 denote the same or corresponding components.

When right and left driving wheels, such as right and left front wheels are substantially rigidly coupled by a viscous joint or the like, the wheel speeds $V_{FLW}$ and $V_{FRW}$ of the left and right front wheels are substantially equal. Even if the front wheel side wheel speed $V_{FW}$, obtained by the low select circuit 3, and both rear wheel speeds $V_{RLW}$ $V_{RRW}$ are input to the high select circuit 5, similar advantages as those in the embodiment in FIG. 1 can be provided.

In the embodiments described above, the accelerating state or the decelerating state is determined by comparing the estimated vehicle speeds $V_{FV}$ with $V_{RV}$, and the wheel speeds $V_{FW}$ and $V_{RW}$. However, it may be alternatively arranged that when the output of the differentiator 7 is positive, an accelerating state is determined, and when the output is negative, the decelerating state is determined. A predetermined acceleration may not be used as the acceleration, but the difference of the speeds at the time of accelerating may be calculated from the output of the differentiator 7 according to an arithmetic equation which is similar to equation (1), and the speed difference thus obtained may be added by the acceleration arithmetic circuits $16_F$ and $16_R$ to the wheel speeds $V_{FW}$ and $V_{RW}$. The vehicle speed at the time of accelerating can, therefore, be estimated.

As another embodiment of the present invention, the difference of the decelerations in the subtractor 19 may be set in response to the index representing the traveling speed, e.g., the maximum wheel speed $V_{HW}$ based upon the fact that the minimum turning radius of the vehicle is determined according to the traveling speed of the vehicle. Also, the difference may be set according to the index representing the lateral acceleration and the traveling speed of the vehicle. Further, the difference may be set in response to the steering angle. The difference of the decelerations corresponding to the turning state of the vehicle can thus be obtained by setting the difference of the deceleration to a variable value.

According to the first feature of the present invention as described above, there is provided a method for estimating a speed of a vehicle with an antilock brake device by obtaining a vehicle speed as a reference value for determining a slip ratio of a wheel based upon a wheel speed, an acceleration, and a deceleration. At least the deceleration is based upon a differentiated value of a highest wheel speed of all wheels. Therefore, the deceleration can approach the actual value at least by selecting and differentiating the wheel speed closest to the vehicle speed by the displacement of the phases of the wheel speeds of all the wheels at the time of controlling the antilock brake.

According to the second feature of the present invention, a method is provided for estimating a speed of a vehicle with an antilock brake device by obtaining a vehicle speed as a reference value for determining a slip ratio of a wheel based upon a wheel speed, an acceleration and a deceleration. Right and left drive wheels are coupled substantially rigidly. At least the deceleration is obtained based upon a differentiated value of a highest value of the lowest wheel speeds of the drive wheels and the driven wheels. Therefore, the speeds of both the drive wheels become substantially equal, and at least the deceleration can approach the actual value, similar to the above first feature.

According to the third feature of the present invention, a predetermined acceleration is used as the acceleration value during accelerating. The differentiated value is used as the deceleration value during decelerating. Therefore, the estimated vehicle speed can approach the actual vehicle speed by setting a large value for the predetermined acceleration.

According to the fourth feature of the present invention, a predetermined acceleration is used as the acceleration value during accelerating. A first set predetermined value is used as the deceleration value when the differentiated value is equal to or less than the first predetermined value. The differentiated value is used as the deceleration when the differentiated value exceeds the first predetermined value at the time of decelerating. Therefore, the maximum deceleration when the phases of the wheel speeds coincide can be restricted.

According to the fifth feature of the present invention, a predetermined acceleration is used as the acceleration value during accelerating. A second predetermined value is used as the deceleration value when the differentiated value exceeds the second predetermined value. The differentiated value is used as the deceleration value when the differentiated value is equal to or less than the second predetermined value during decelerating. Therefore, the minimum deceleration can be restricted when the phases of the wheel speeds coincide.

According to the sixth feature of the present invention, a vehicle body speed is estimated based upon a lowest wheel speed of a plurality of wheels including right and left wheels on at least one axis. A predetermined acceleration is used as the acceleration value during accelerating. A value is obtained for the deceleration value at the time of decelerating by subtracting a deceleration difference of inner and outer wheels from the differentiated value. The deceleration difference of inner and outer wheels is generated due to the difference of the speeds of the inner and outer wheels when the vehicle is shifted from traveling in a rectilinear direction to traveling in a turning direction. Therefore, the estimation accuracy can be improved by considering the difference of the decelerations of the inner and outer wheels at the time the vehicle changes its direction of travel.

According to the seventh feature of the present invention, the predetermined acceleration is the maximum acceleration of the vehicle. Therefore, the predetermined acceleration is set to the maximum acceleration of the vehicle, thereby rapidly approaching the estimated vehicle speed.

According to the eighth feature of the present invention, the first predetermined value is the maximum acceleration of the vehicle. Therefore, the maximum deceleration can be restricted in accordance with the maximum deceleration of the vehicle body.

According to the ninth feature of the present invention, the second predetermined value is set to the minimum deceleration on a slippery road surface. Therefore, the minimum deceleration is restricted by the minimum deceleration on the slippery road surface, thereby rapidly obtaining the deceleration close to the actual deceleration.

According to the tenth feature of the present invention, a difference of the deceleration is set in response to an index representing the traveling speed based on a minimum turning radius of the vehicle according to the traveling speed of the vehicle. According to the eleventh feature of the present invention, a difference of the deceleration is set in response to an index representing the lateral acceleration of the vehicle and the traveling speed of the vehicle body. According to the twelfth feature of the present invention, a difference of the decelerations is set in response to a steering angle. Therefore, the difference of the decelerations of the inner and outer wheels can be considered corresponding to the turning state of the vehicle, thereby contributing to the improvement in the estimation accuracy of the vehicle speed.

According to the thirteenth feature of the present invention, a difference of the decelerations is set as the difference of the decelerations between the inner and outer wheels during turning at a speed in which the difference of the speeds between the inner and outer wheels is a maximum so that the estimated vehicle speed can rapidly approach the actual vehicle speed at the time of accelerating, which is similar to the third feature. The maximum deceleration, when the phases of the wheel speeds coincide, can be restricted. Therefore, the difference of the deceleration is set as a fixed value, and the influence of the difference of the decelerations between the inner and outer wheels during turning can be considered while simplifying the control arrangement.

From the foregoing description of the preferred embodiments of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What is claimed is:

1. A method of estimating a speed of a vehicle which is equipped with an antilock brake device, said method comprising the steps of:
   detecting wheel speeds of wheels of the vehicle respectively;
   selecting a highest value of all detected wheel speeds and differentiating a selected highest value to obtain a differentiated value; and
   correcting any of the wheel speeds based on said differentiated value, at least when one of the wheels associated with said one wheel speed shows a large decelerating tendency, to obtain a vehicle speed which is used as a reference value for determining a slip ratio of said one wheel.

2. A method of estimating a speed of a vehicle, which is equipped with an antilock brake device, left and right drive wheels coupled substantially rigidly and left and right driven wheels, said method comprising the steps of:
   detecting wheel speeds of the drive and driven wheels, respectively;
   selecting a lowest value of the wheel speeds of the drive wheels, selecting a highest value of the selected lowest drive wheel speed and the wheel speeds of the driven wheels, and differentiating the selected highest value to obtain a differentiated value; and
   correcting any one of the wheel speeds based on said differentiated value, at least when one of the wheels associated with said one wheel speed shows a large decelerating tendency, to obtain a vehicle speed which is used as a reference value for determining a slip ratio of said one wheel.

3. A method for estimating a speed of a vehicle, which is equipped with an antilock brake device according to claim 1, wherein the wheels include front wheels and rear wheels, and further comprising the step of subjecting the wheel speeds of the front wheels to a low selection, subjecting the wheel speeds of the rear wheels to a low selection, and correcting each of the selected lowest front wheel speed and rear wheel speed based on said differentiated value to provide said reference value for use in each of the front wheels and rear wheels.

4. A method of estimating a speed of a vehicle which is equipped with an antilock brake device according to claim 2, and further comprising the steps of subjecting the wheel speeds of the drive wheels to a low selection, subjecting the wheel speeds of the driven wheels to a low selection, and correcting each of the selected lowest drive wheel speed and driven wheel speed based on said differentiated value to provide said reference value for use on each of the drive wheels and driven wheels.

5. A method for estimating a speed of a vehicle which is equipped with an antilock brake device according to claim 1 or 2, further comprising the steps of using a predetermined acceleration as the acceleration during accelerating, and using said differentiated value as the deceleration during decelerating.

6. A method for estimating a speed of a vehicle which is equipped with an antilock brake device according to claim 1 or 2, further comprising the steps of using a predetermined acceleration as the acceleration during accelerating, and using a first predetermined value as the deceleration when the differentiated value becomes equal to or less than the first predetermined value and using the differentiated value as the deceleration when the differentiated value exceeds the first predetermined value during decelerating.

7. A method for estimating a speed of a vehicle which is equipped with an antilock brake device according to claim 1 or 2, further comprising the steps of using a predetermined acceleration as the acceleration during accelerating, and using a second predetermined value as the deceleration when the differentiated value exceeds the second predetermined value, and using the differentiated value as the deceleration when the differentiated value is equal to or less than the second predetermined value during decelerating.

8. A method for estimating a speed of a vehicle which is equipped with an antilock brake device according to claim 1 or 2, further comprising the steps of using a predetermined acceleration as the acceleration during accelerating, and using a value as the deceleration during decelerating, said value obtained by subtracting from the differentiated value a deceleration difference which is generated between wheels on an inner side and on an outer side due to a difference of speeds between the inner and outer wheels when the vehicle is shifted from traveling in a rectilinear direction to traveling in a turning direction.

9. A method for estimating a speed of a vehicle which is equipped with an antilock brake device according to claim 5, further comprising the step of setting the predetermined acceleration to a maximum acceleration of a four-wheel vehicle.

10. A method for estimating a speed of a vehicle which is equipped with an antilock brake device according to claim 6, further comprising the step of setting the first predetermined value to a maximum deceleration of the vehicle.

11. A method for estimating a speed of a vehicle which is equipped with an antilock brake device according to claim 7, further comprising the step of setting the second predetermined value to a minimum deceleration obtained on a slippery road surface.

12. A method for estimating a speed of a vehicle which is equipped with an antilock brake device according to claim 8, further comprising the step of setting the deceleration difference in response to an index representing a traveling speed of the vehicle which determines a minimum turning radius of the vehicle.

13. A method for estimating a speed of a vehicle which is equipped with an antilock brake device according to claim 8, further comprising the step of setting the deceleration difference in response to an index representing a lateral acceleration and a traveling speed of the vehicle.

14. A method for estimating a speed of a vehicle which is equipped with an antilock brake device according to claim 8, further comprising the step of setting the deceleration difference in response to a steering angle.

15. A method for estimating a speed of a vehicle which is equipped with an antilock brake device according to claim 8, further comprising the step of setting the deceleration difference to be a difference of the decelerations between the inner and outer wheels during turning at a speed that the difference of the speeds between the inner and outer wheels becomes a maximum.

16. A method for estimating a speed of a vehicle which is equipped with an antilock brake device according to claim 6, further comprising the step of setting the predetermined acceleration to a maximum acceleration of a four-wheel vehicle.

17. A method for estimating a speed of a vehicle which is equipped with an antilock brake device according to claim 7, further comprising the step of setting the predetermined acceleration to a maximum acceleration of a four-wheel vehicle.

18. A method for estimating a speed of a vehicle which is equipped with an antilock brake device according to claim 8, further comprising the step of setting the predetermined acceleration to a maximum acceleration of a four-wheel vehicle.

19. A method for estimating a speed of a vehicle which is equipped with an antilock brake device according to claim 6, further comprising the steps of using a predetermined acceleration as the acceleration during accelerating, and using a second predetermined value as the deceleration when the differentiated value is equal to or less than the second predetermined value during decelerating.

* * * * *